(12) United States Patent
Brisbane

(10) Patent No.: US 9,153,810 B2
(45) Date of Patent: Oct. 6, 2015

(54) BATTERY COVER FOR A HIGH VOLTAGE AUTOMOTIVE BATTERY

(71) Applicant: GM Global Technology Operations LLC, Detroit, MI (US)

(72) Inventor: Roger M. Brisbane, Washington, MI (US)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 14/337,407

(22) Filed: Jul. 22, 2014

(65) Prior Publication Data

US 2014/0325831 A1  Nov. 6, 2014

Related U.S. Application Data

(62) Division of application No. 13/045,964, filed on Mar. 11, 2011, now Pat. No. 8,859,130.

(51) Int. Cl.
| | |
|---|---|
| *H01M 2/04* | (2006.01) |
| *H01M 2/20* | (2006.01) |
| *H01M 2/10* | (2006.01) |
| *B23K 26/20* | (2014.01) |
| *H01M 2/30* | (2006.01) |

(52) U.S. Cl.
CPC ............... *H01M 2/202* (2013.01); *B23K 26/20* (2013.01); *H01M 2/043* (2013.01); *H01M 2/1077* (2013.01); *H01M 2/206* (2013.01); *H01M 2/30* (2013.01); *Y02E 60/12* (2013.01); *Y10T 29/49108* (2015.01)

(58) Field of Classification Search
CPC ...................................................... H01M 2/04
See application file for complete search history.

(56) References Cited

U.S. PATENT DOCUMENTS

| | | | | |
|---|---|---|---|---|
| 5,534,364 | A * | 7/1996 | Watanabe et al. ............... | 429/61 |
| 2009/0297892 | A1 * | 12/2009 | Ijaz et al. ......................... | 429/7 |

FOREIGN PATENT DOCUMENTS

| | | |
|---|---|---|
| CN | 101483227 A | 7/2009 |
| JP | 2002151045 A | 5/2002 |

* cited by examiner

*Primary Examiner* — Ula Ruddock
*Assistant Examiner* — Jacob Marks
(74) *Attorney, Agent, or Firm* — Fraser Clemens Martin & Miller LLC; James D. Miller

(57) ABSTRACT

A cover for a battery module having a plurality of battery cells arranged in a stacked configuration includes a non-conductive main body having a plurality of spaced apart recessed regions formed therein and a plurality of electrically conductive connectors, each of the connectors disposed in one of the recessed regions and coupled to the main body.

20 Claims, 4 Drawing Sheets

BATTERY COVER FOR A HIGH VOLTAGE AUTOMOTIVE BATTERY

CROSS-REFERENCE TO RELATED APPLICATIONS

This application is a divisional application of U.S. application Ser. No. 13/045,964, filed on Mar. 11, 2011. The entire disclosure of the above application is incorporated herein by reference.

FIELD OF THE INVENTION

The present invention relates generally to a battery module. In particular, the invention is directed to a battery cover for a battery module including a plurality of the battery cells.

BACKGROUND OF THE INVENTION

A battery cell has been proposed as a clean, efficient and environmentally responsible power source for electric vehicles and various other applications. One type of battery cell is known as the lithium-ion battery. The lithium-ion battery is rechargeable and can be formed into a wide variety of shapes and sizes so as to efficiently fill available space in electric vehicles. A plurality of individual lithium-ion battery cells can be provided in a battery cell module to provide an amount of power sufficient to operate electric vehicles.

For example, a conventional battery module includes a plurality of battery cells arranged in a stacked configuration and in electrical communication with an electrical device (e.g. battery disconnect unit (BDU) or load). Each of the battery cells includes a cathode terminal and an anode terminal. Typically, the anode terminal and cathode terminal of each of the battery cells are electrically connected in a series configuration in order to maximize the voltage output of the battery module. In certain designs, a battery cover is disposed over the stack of the battery cells to isolate and protect the anode and cathode terminals of each of the battery cells.

It would be desirable to develop a cover for a battery module including a plurality of battery cells arranged in a stacked configuration, wherein the cover optimizes a mechanical and electrical connection between the battery cells while minimizing complexity.

SUMMARY OF THE INVENTION

Concordant and consistent with the present invention, a cover for a battery module including a plurality of battery cells arranged in a stacked configuration, wherein the cover optimizes a mechanical and electrical connection between the battery cells while minimizing complexity, has surprisingly been discovered.

In one embodiment, a cover for a battery module having a plurality of battery cells arranged in a stacked configuration comprises: a non-conductive main body having a plurality of spaced apart recessed regions formed therein; and a plurality of electrically conductive connectors, each of the connectors disposed in one of the recessed regions and coupled to the main body.

In another embodiment, a battery module comprises: a plurality of battery cells arranged in a stacked configuration, each of the battery cells including a first terminal having a positive electrical charge and a second terminal having a negative electrical charge disposed adjacent a first end thereof, a cover having a main body with a plurality of spaced apart recessed regions formed therein; and a plurality of electrically conductive connectors, each of the connectors disposed in one of the recessed regions formed in the main body of the cover, each of the connectors abutting at least one of the first terminal and the second terminal of at least one of the battery cells, wherein the first terminal of the at least one of the battery cells is in direct electrical communication with the second terminal of an adjacent one of the battery cells through one of the connectors.

The present invention also includes methods of manufacturing a battery module.

One method includes the steps of: arranging a plurality of battery cells in a stacked configuration, each of the battery cells including a first terminal having a positive electrical charge and a second terminal having a negative electrical charge disposed adjacent a first end thereof, disposing a cover adjacent the first terminal and the second terminal of each of the battery cells, the cover having a main body with a plurality of spaced apart recessed regions formed therein and each of a plurality of electrically conductive connectors is disposed in one of the recessed regions, each of the connectors abutting at least one of the first terminal and the second terminal of at least one of the battery cells; and passing an electromagnetic radiation through the main body of the cover to weld each of the connectors to the at least one of the first terminal and the second terminal of at least one of the battery cells, wherein the first terminal of the at least one of the battery cells is in direct electrical communication with the second terminal of an adjacent one of the battery cells through one of the connectors.

BRIEF DESCRIPTION OF THE DRAWINGS

The above, as well as other advantages of the present invention, will become readily apparent to those skilled in the art from the following detailed description of the preferred embodiment when considered in the light of the accompanying drawings in which.

DETAILED DESCRIPTION OF EXEMPLARY EMBODIMENTS OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
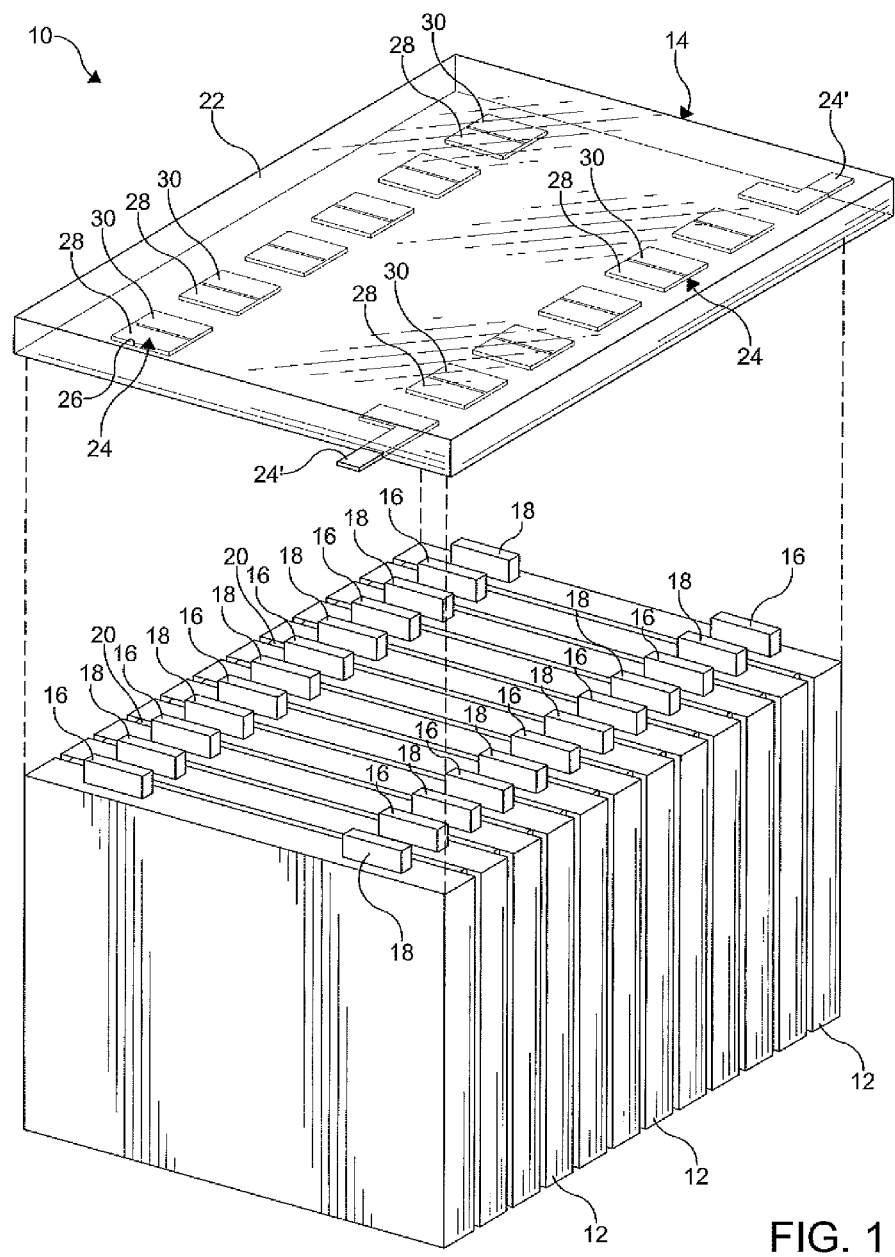
FIG. 1 is a partially exploded front perspective view of a battery module including a battery cover according to an embodiment of the present invention.
Figure 2:
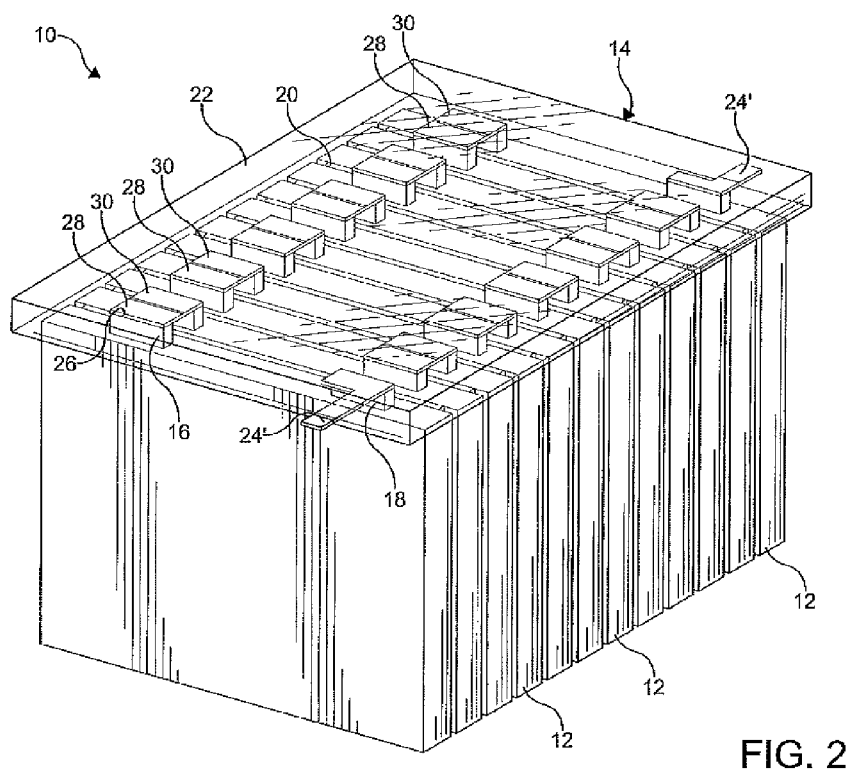
FIG. 2 is a front perspective view of the battery module of FIG. 1 showing the battery cover coupled to a plurality of battery cells of the battery module.

FIGS. 1-2 illustrate a battery module 10 according to an embodiment of the present invention. As shown, the battery module 10 includes a plurality of battery cells 12 arranged in a stacked configuration and a battery cover 14 disposed adjacent the stack of battery cells 12. As a non-limiting example, the battery module 10 includes twelve of the battery cells 12. However, any number of the battery cells 12 can be included to provide a pre-determined voltage.

Each of the battery cells 12 includes a pair of terminals 16, 18 (e.g. tabs). As a non-limiting example, the first terminal 16 (e.g. anode) is associated with a negative electrical charge and the second terminal 18 (e.g. cathode) is associated with a positive electrical charge. In certain embodiments, the first terminal 16 of each of the battery cells 12 is formed from copper, while the second terminal 18 of the each of the battery cells 12 is formed from aluminum. However, it is understood that each of the terminals 16, 18 can be formed from any conductive material.

In the embodiment shown, the first terminal 16 and the second terminal 18 of each of the battery cells 12 are disposed on the same end of each of the associated battery cells 12, as appreciated by one skilled in the art. In certain embodiments, each of the battery cells 12 is a prismatic battery cell having a rectangular metal can (i.e. housing). However, other types of battery cells having other shapes and configurations can be used. As a non-limiting example, the battery cells 12 are arranged in an alternating configuration, wherein the first terminal 16 of one of the battery cells 12 is aligned with the second terminal 18 of an adjacent one of the battery cells 12. However, other configurations can be used.

In certain embodiments, a cooling plate 20 is disposed between adjacent ones of the battery cells 12. It is understood that the cooling plates 20 can be configured to pass a coolant therethrough. As a non-limiting example, each of the cooling plates 20 forms part of a cooling circuit for a liquid coolant system (not shown), as appreciated by one skilled in the art. However, other cooling systems and thermal management systems can be used.

Figure 3:
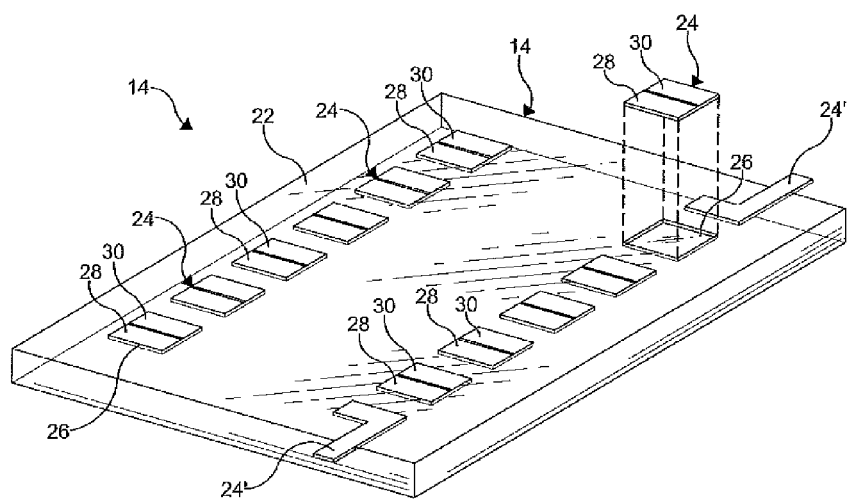
FIG. 3 is a bottom perspective view of the battery cover of the battery module of FIGS. 1.

As more clearly shown in FIG. 3, the battery cover 14 includes a main body 22 and a plurality of electrically conductive connectors 24 coupled to the main body 22. The main body 22 is typically formed (e.g. molded) from a non-conductive material (e.g. plastic, glass, or the like). As a non-limiting example, the main body 22 is substantially transparent, wherein an electromagnet radiation (e.g. laser) can pass therethrough. In the embodiment shown, the main body 22 has a substantially rectangular planar shape. However, the main body 22 can have any shape and size. As a further non-limiting example, a plurality of spaced apart recessed regions 26 (i.e. cutouts) is formed on a lower side of the main body 22, while an upper side of the main body 22 is substantially planar and flat. It is understood that any number of the recessed regions 26 can be formed in the main body 22.

The connectors 24 are typically coupled to the lower side of the main body 22 to abut each of the terminals 16, 18 of each of the battery cells 12, when the cover 14 is positioned on the stack of the battery cells 12. As a non-limiting example, each of the connectors 24 has a substantially planar shape. However, the connectors 24 can have any size and shape. As a further non-limiting example, each of the connectors 24 is disposed in one of the recessed regions 26 formed in the main body 22. In certain embodiments, each of the connectors 24 is insert molded with the main body 22. However, the connectors 24 can be coupled to any portion of the main body 22 using other means such as adhesives and other mechanical connections.

In the embodiment shown, each of the connectors 24 has a first portion 28 formed from a first conductive material (e.g. copper) and a second portion 30 formed from a second conductive material (e.g. aluminum). As a non-limiting example, the first conductive material is different from the second conductive material. However, the connectors 24 can be formed from any electrically conductive material. As a non-limiting example, the first portion 28 of the at least one of the connectors 24 is coupled to the second portion 30 using an ultrasonic welding technique, a diffusion bonding, or another coupling technique now know or later developed. As a further non-limiting example, a strip of the first conductive material is disposed adjacent a strip of the second conductive material and the strips are coupled together using a coupling technique such as a continuous ultrasonic welding, for example. The joined strips are then cut to provide the connectors 24 having the first portion 28 formed from the first conductive material and the second portion 30 formed from the second conductive material. It is understood that other means of coupling the first portion 28 and the second portion 30 can be used.

Figure 4:
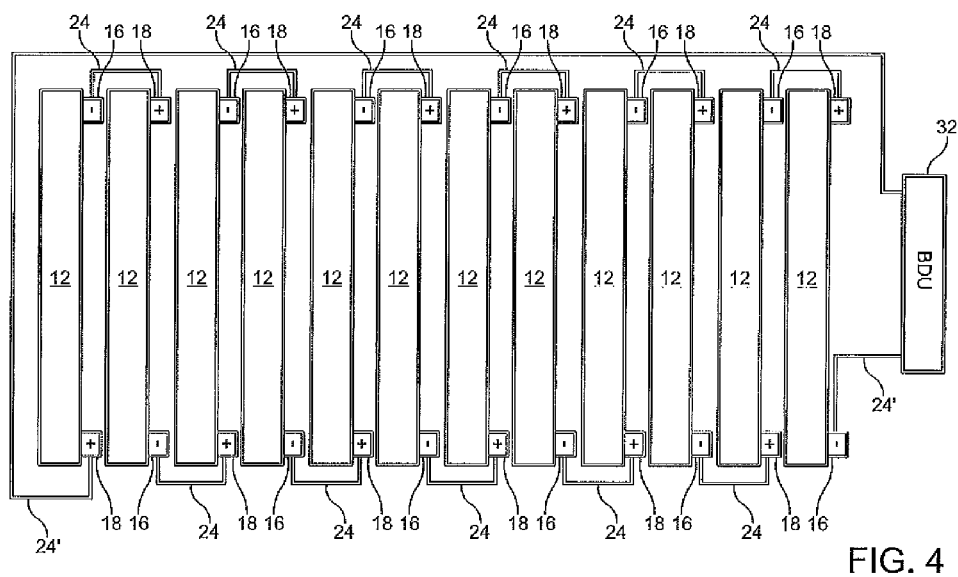
FIG. 4 is schematic representation of the battery module of FIG. 1 in electrical communication with a battery disconnect unit according to an embodiment of the present invention.

In the embodiment shown, each of a pair of end connectors 24', similar to the connectors 24 except as described herein below, is disposed adjacent opposite ends of the main body 22 of the cover 14 and positioned to extend beyond a peripheral edge of the main body 22. As a non-limiting example, one of the end connectors 24' is electrically coupled to the anode terminal 16 of one of the battery cells 12 positioned at an end of the stack configuration, while the other of the end connectors 24' is electrically coupled to the cathode terminal 18 of one of the battery cells 12 positioned at another end of the stack. Accordingly, the end connectors 24' collectively provide a positive and negative end terminal for electrical circuit connection to another device 32 such as a load, a BDU, and another one of the battery modules 10, for example (as shown in FIG. 4). As a further non-limiting example, each of the end connectors 24' is generally "L" shaped and positioned in one of the recessed regions 26 formed in the main body 22. However, it is understood that the end connectors 24' can have any shape and can be positioned in any location relative to the cover 14.

To assemble the battery module 10, each of the battery cells 12 is disposed adjacent another of the battery cells 12 having a different orientation to form a stacked configuration. The terminals 16, 18 of each of the battery cells 12 are electrically coupled to each other in a pre-determined sequence and electrical configuration (e.g. in series). Specifically, the cover 14 is positioned adjacent the terminals 16, 18 of each of the battery cells 12, wherein the connectors 24, 24' are aligned with the terminals 16, 18 of the battery cells 12. As a non-limiting example, the connectors 24 are arranged in a pre-determined layout so that the first portion 28 of each of the connectors 24 is disposed adjacent the first terminal 16 of an associated one of the battery cells 12 and the second portion 30 of each of the connectors 24 is disposed adjacent the second terminal 18 of an associated one of the battery cells 12. Additionally, one of the end connectors 24' is disposed adjacent the first terminal 16 of one of the battery cells 12 disposed at an end of the stack, while the other of the end connectors 24' is disposed adjacent to the second terminal 18 of one of the battery cells 12 disposed at an opposite end of the stack. It is understood that the connectors 24, 24' can be directly abutting respective ones of the terminals 16, 18.

Once the cover 14 is in position, the connectors 24, 24' are coupled to the respective terminals 16, 18 of the battery cells 12. In certain embodiments, an electromagnetic radiation (e.g. laser) is passed through the main body 22 of the cover 14 to weld the connectors 24, 24' to the respective terminals 16, 18. However, other coupling means can be used.

As a non-limiting example, the first terminal 16 (e.g. anode) of at least one of the battery cells 12 is in direct electrical communication with the second terminal 18 (e.g. cathode) of an adjacent one of the battery cells 12. As a further non-limiting example, a direct electrical communication can be defined as a current flowing between the first terminal 16 (e.g. anode) of the at least one of the battery cells 12 and the second terminal 18 (e.g. cathode) of the adjacent one of the battery cells 12 without intervening electrical contact with another of the battery cells 12. In certain embodiments, the end connectors 24' protrude from the main body 22 of the cover 14 to facilitate connection of the battery module 10 to the device 32 or other system (as shown in FIG. 4). It is understood that electrically conductive bus bars (not shown) can be used to electrically couple the end connectors 24' to the device 32. It is further understood that other means of providing electrical communication between the battery module 10 and another device or system can be used.

Each of the battery cells 12 typically has two electrical connection points (i.e. the terminals 16, 18), wherein one of the connection points is formed from a copper material and the other of the connection points is formed from an aluminum material. For effective joining together, the materials of the electrical connection points should be joined with like material. In other words, copper should connect to copper and aluminum to aluminum. The battery module 10 including the cover 14 of the present invention facilitates the electrical connection of multiple battery cells with a single assembled apparatus (i.e. the cover 14 including the connectors 24, 24').

Since the conductive connectors 24, 24' are integrated with the main body 22, the cover 14 of the present invention minimizes a profile of a battery connection apparatus and the overall profile of the battery module 10. The cover 14 includes an electrically insulative main body 22 that provides a "touch safe" surface without requiring a distinct safety cover. The battery module 10 of the present invention optimizes a mechanical and electrical connection between the battery cells 12 while minimizing complexity and the overall number of required parts.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A method of manufacturing a battery module, the method comprising the steps of:
    arranging a plurality of battery cells in a stacked configuration, each of the battery cells including a first terminal having a positive electrical charge and a second terminal having a negative electrical charge disposed adjacent a first end thereof;
    disposing a cover adjacent the first terminal and the second terminal of each of the battery cells, the cover having a main body with a plurality of spaced apart recessed regions formed therein and a plurality of electrically conductive connectors, wherein each of the connectors is disposed in one of the recessed regions and abuts at least one of the first terminal and the second terminal of at least one of the battery cells; and
    passing electromagnetic radiation through the main body of the cover to weld each of the connectors to the at least one of the first terminal and the second terminal of at least one of the battery cells, wherein the first terminal of the at least one of the battery cells is in direct electrical communication with the second terminal of an adjacent one of the battery cells through one of the connectors.

2. The method according to claim 1, wherein direct electrical communication between the battery cells is only established with the cover in an installed position.

3. The method according to claim 1, wherein the first terminal on each of the battery cells is formed from a first conductive material and the second terminal on each of the battery cells is formed from a second conductive material different from the first conductive material.

4. The method according to claim 3, wherein each of the connectors includes a first portion formed from the first conductive material and a second portion formed from the second conductive material.

5. The method according to claim 4, wherein the first terminal of each of the battery cells is coupled to the first portion of one of the connectors and the second terminal of each of the battery cells is coupled to the second portion of one of the connectors.

6. The method according to claim 1, wherein the battery cells are configured in opposing orientation to align the first terminal of one of the battery cells with a second terminal of an adjacent one of the battery cells.

7. The method according to claim 1, wherein the main body is substantially transparent.

8. The method according to claim 1, wherein at least one of the connectors has a substantially planar shape with a first portion formed from a first conductive material and a second portion formed from a second conductive material.

9. The method according to claim 8, wherein the first conductive material is different from the second conductive material.

10. The method according to claim 1, wherein at least one of the connectors is substantially "L" shaped.

11. The method according to claim 1, wherein at least one of the connectors extends beyond a peripheral edge of the main body.

12. The method according to claim 1, wherein the main body is non-conductive.

13. A method of manufacturing a battery module, the method comprising the steps of:
    arranging a plurality of battery cells in a stacked configuration, each of the battery cells including a first terminal having a positive electrical charge and a second terminal having a negative electrical charge disposed adjacent a first end thereof, wherein the first terminal on each of the battery cells is formed from a first conductive material and the second terminal on each of the battery cells is formed from a second conductive material different from the first conductive material;
    disposing a cover adjacent the first terminal and the second terminal of each of the battery cells, the cover having a non-conductive main body with a plurality of spaced apart recessed regions formed therein and a plurality of electrically conductive connectors, wherein each of the connectors is disposed in one of the recessed regions and abuts at least one of the first terminal and the second terminal of at least one of the battery cells; and
    passing electromagnetic radiation through the main body of the cover to weld each of the connectors to the at least one of the first terminal and the second terminal of at least one of the battery cells, wherein the first terminal of the at least one of the battery cells is in direct electrical communication with the second terminal of an adjacent one of the battery cells through one of the connectors.

14. The method according to claim 13, wherein direct electrical communication between the battery cells is only established with the cover in an installed position.

15. A method of manufacturing a battery module, the method comprising the steps of:
    arranging a plurality of battery cells in a stacked configuration, each of the battery cells including a first terminal having a positive electrical charge and a second terminal having a negative electrical charge disposed adjacent a first end thereof;
    disposing a cover adjacent the first terminal and the second terminal of each of the battery cells, the cover having a non-conductive and substantially transparent main body with a plurality of spaced apart recessed regions formed therein and a plurality of electrically conductive connectors, wherein each of the connectors is disposed in one of the recessed regions and abuts at least one of the first terminal and the second terminal of at least one of the battery cells; and passing electromagnetic radiation through the main body of the cover to weld each of the connectors to the at least one of the first terminal and the second terminal of at least one of the battery cells, wherein the first terminal of the at least one of the battery cells is in direct electrical communication with the second terminal of an adjacent one of the battery cells through one of the connectors.

16. The method according to claim 15, wherein direct electrical communication between the battery cells is only established with the cover in an installed position.

17. The method according to claim 15, wherein the electromagnetic radiation comprises a laser.

18. The method according to claim 15, wherein the first terminal on each of the battery cells is formed from a first conductive material and the second terminal on each of the battery cells is formed from a second conductive material different from the first conductive material.

19. The method according to claim 18, wherein each of the connectors includes a first portion formed from the first conductive material and a second portion formed from the second conductive material.

20. The method according to claim 19, wherein the first terminal of each of the battery cells is coupled to the first portion of one of the connectors and the second terminal of each of the battery cells is coupled to the second portion of one of the connectors.

* * * * *